Nov. 22, 1966  J. A. ROYER  3,286,722
VACUUM BREAKER
Filed July 27, 1964  2 Sheets-Sheet 1
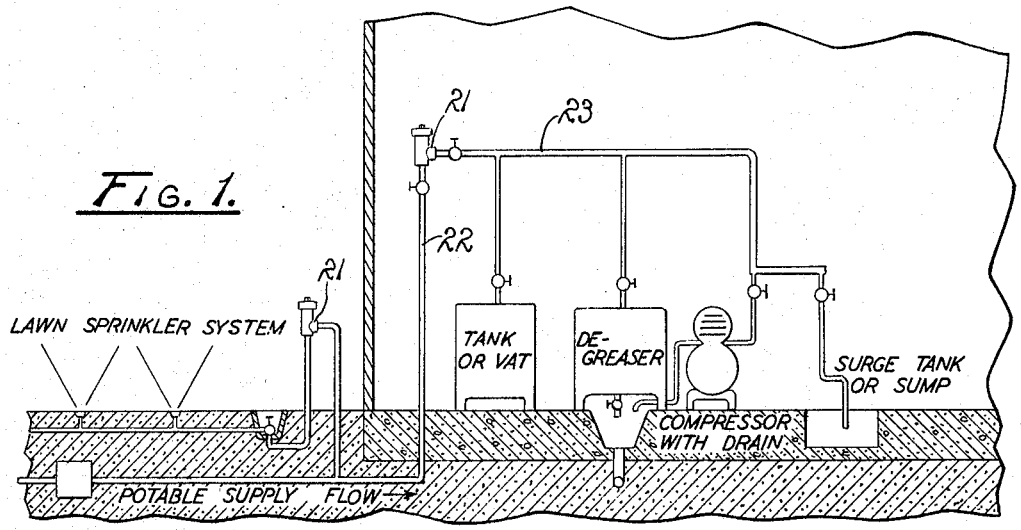
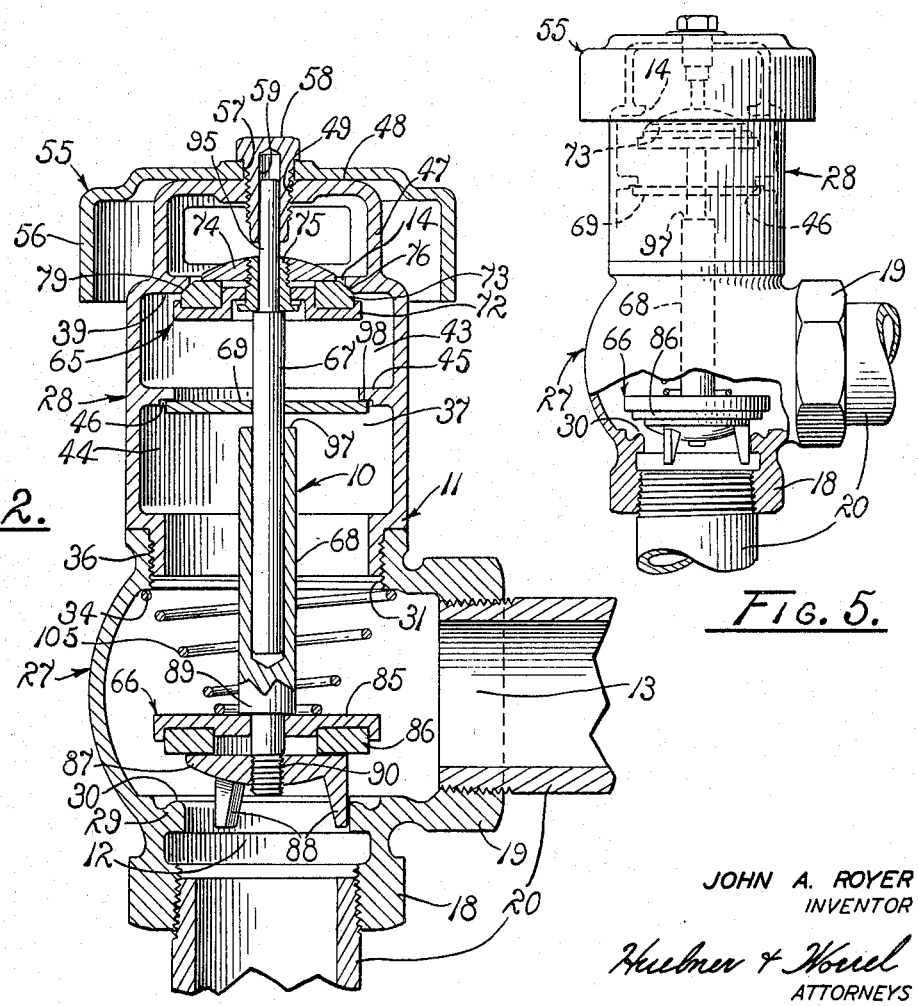
JOHN A. ROYER
INVENTOR
Huebner & Worrel
ATTORNEYS

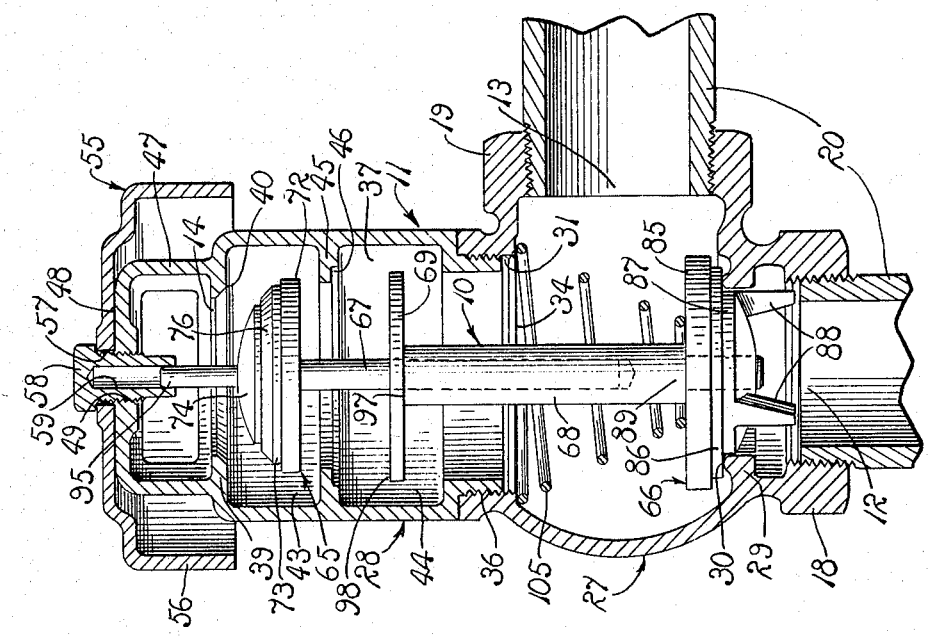
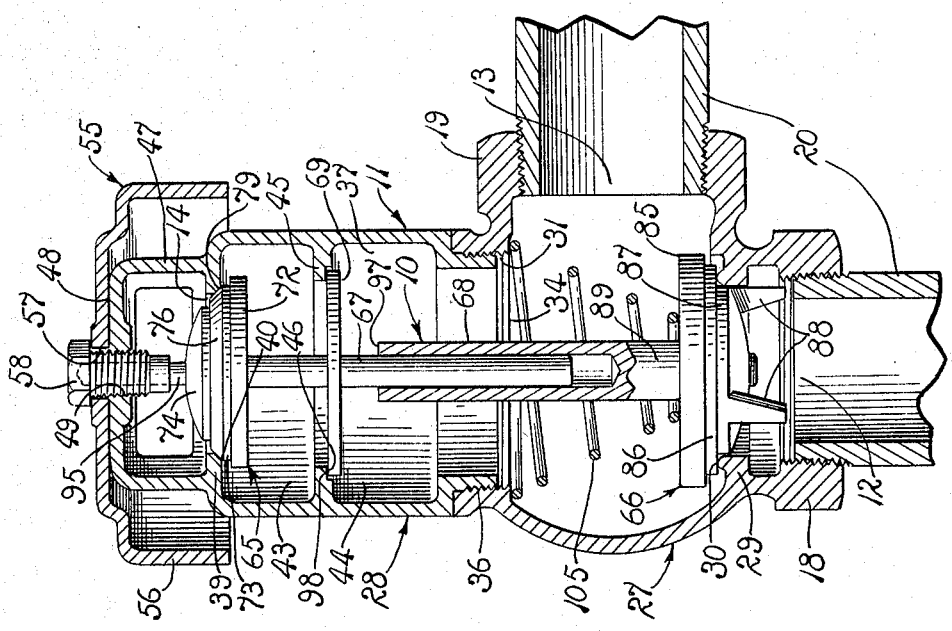

United States Patent Office 3,286,722
Patented Nov. 22, 1966

3,286,722
VACUUM BREAKER
John A. Royer, Fresno, Calif., assignor to Buckner Industries, Inc., a corporation of California
Filed July 27, 1964, Ser. No. 385,413
7 Claims. (Cl. 137—218)

This invention relates to an improved vacuum breaker and more particularly to such a vacuum breaker having a compact simplified structure capable of preventing backflow and leakage in a water supply system.

In water supply lines the possibility often exists of a backflow of nonpotable soiled water, with resultant contamination of an upstream potable water supply. Such an occurrence results when the line pressure in a potable system situated upstream of the fixtures installed in a nonpotable system drops too low, causing a reverse pressure differential and, in effect, drawing the downstream water back into the main potable water supply line. If any downstream fixtures are open when this occurs, any waste water immediately accessible to such fixtures is drawn back into the line and contaminates the main supply.

Vacuum breaker valves have been developed for venting water supply lines to atmosphere so as to avoid pressures lower than atmosphere and thus to prevent backflow. Such vacuum breakers also often include check valves for physically obstructing any backflow. Two general types of vacuum breakers have evolved: the pressure type, as distinguished from the atmospheric or antisiphoning type. The present invention is suited for use in both, and is particularly adaptable to the former. The atmospheric type is typically used for fluid containers having inverted water supply inlets and, when installed for use, is normally under minimal continuous pressures or under intermittent pressures for short and infrequent periods only. One such vacuum breaker is required for each fixture.

To prevent backflow, pressure-type vacuum breakers usually include a check valve, as well as a vent to atmosphere. This type is typically installed in water-supply lines under substantially continuous fluid pressure, such as when used to isolate entire nonpotable systems from upstream potable systems. Such general protection renders it unnecessary to protect each individual fixture in a nonpotable system and is generally acceptable for many types of water-supply systems, such as for lawn sprinkler systems, flushing connections for industrial tanks, vats and sumps, coolant systems for large air compressors or for priming of pumps handling sewage or unsafe material.

Since typical use of pressure-type vacuum breakers involves installation in lines which are under substantial continuous fluid pressure, the atmospheric venting of such devices has resulted in a characteristic leakage problem. Attempts to remedy this tendency by the use of resilient diaphragm elements have not been satisfactory due to the imperfect sealing properties of flexible membranes as well as their insufficient durability. Other attempts have involved the use of additional valves mounted within the same housing, however, these have necessitated more complex and bulky structures, obviously undesirable for economic reasons. As a consequence of this characteristic leakage, pressure-type vacuum breakers have been customarily installed outside buildings.

Therefore, it is an object of the present invention to provide an improved vacuum breaker.

Another object is to provide such a vacuum breaker having an element for blocking backflow.

Another object is to provide such a vacuum breaker capable of effective operation in fluid supply lines under pressure.

Another object is to provide such a device which is leakproof and affords a greater zone of utility than previously available pressure-type vacuum breakers.

Another object is to provide such a device of simple, economical design, which is reliable in operation.

Another object is to provide such a device possessing a high degree of durability.

Another object is to provide such a device having a single valve closure assembly embodying all the valve closing features of the device and requiring only one supporting structure.

Further objects and advantages will become apparent in the subsequent description in the specification.

In the drawings:

FIG. 1 is a view in side elevation and partially schematic of typical nonpotable water systems each having a vacuum breaker installed for preventing backflow of nonpotable water into a main potable water system.

FIG. 2 is a view in transverse vertical section of a vacuum breaker embodying the principles of the present invention, with the working parts shown in position for normal fluid flow.

FIG. 3 is a view in transverse vertical section of the vacuum breaker of FIG. 2 with the working parts shown in elevation in position for blocking backflow without atmospheric venting.

FIG. 4 is a view in transverse vertical section of the vacuum breaker of FIG. 2 with the working parts shown in elevation in position for full atmospheric venting.

FIG. 5 is a fragmentary view in elevation of the vacuum breaker of FIG. 2, with the working parts shown in elevation in a transitional position, for atmospheric venting and partial fluid flow.

Referring more particularly to the drawings, the vacuum breaker of the present invention consists of a closure assembly 10 mounted reciprocatingly in a housing 11 having a fluid inlet port 12, an outlet port 13 and an opening 14 to atmosphere. The ports are provided with internally threaded fittings 18 and 19, respectively, and connected to the corresponding threaded pipes of a water-supply line 20. The vacuum breaker is employed in the water-supply line as shown at 21 in FIG. 1. The water line leads from a main potable water system 22 to a nonpotable system 23.

The housing 11 consists of a body member 27 having a cylindrical bonnet 28 superimposed thereon. The body member has a lower wall 29, the interior surface of which provides an annular seal face 30 circumscribing the fluid inlet port 12. The outlet port 13 opens laterally of the body member 27. The upper wall of the body member provides a circular threaded aperture 31 for mounting the bonnet 28. The interior surface of the upper wall forms an annular horizontal face 34 circumscribing the aperture.

The bonnet 28 is mounted in the body member aperture 31 so as to form a fluid-tight seal, which may be accomplished by threaded union as shown at 36. The bonnet provides a round cylindrical compartment 37 extending upwardly to the atmospheric vent 14 in the upper wall 39 of the bonnet and serves as a passageway between the body 27 and the vent 14. The interior surface of the wall provides an annular shoulder 40 as a sealing face circumscribing the vent. The bonnet compartment is separated vertically into two portions 43 and 44 by an annular flange 45 having a bottom rim affording a smooth-surfaced annular seat 46. A vented superstructure 47 projects above the bonnet providing a substantially flat top surface 48 having a vertical aperture 49 disposed centrally above the vent 14.

A protective cap 55 is mounted on the bonnet superstructure 47, as is in the form of an inverted bowl with sides 56 extending downwardly about the superstructure in a protective shroud. The cap 55 has a central aperture 57, which is aligned with an aperture 49 of the superstructure. The cap is tightly secured to the superstructure by means of an enlarged hollow screw 58 which extends downwardly through the aligned apertures and provides an inverted vertical well 59 disposed centrally above the vent 14.

The valve closure assembly 10 is mounted for vertical reciprocation within the housing 11. The assembly includes an atmospheric-sealing member 65, a line-sealing member 66, an upright central stem 67 depending from the atmospheric-sealing member, an upright tubular rod 68 extending upwardly from the line-sealing member engaging the stem as a sliding sleeve, and an intermediate disk-like valve member 69 mounted for independent vertical reciprocation on the stem.

The atmospheric-sealing member 65 provides a rigid annular platform 72 supporting an annular elastomeric seal 73 secured concentrically in place on the platform by a clamping nut 74. The assembled member is mounted on the upper end portion of the stem 67 in any suitable manner such as, for instance, by means of a threaded adapter 75 affixed to the stem and providing threads for securing the nut in locked position. When properly mounted, the atmospheric-sealing member occupies a position in the upper portion 43 of the bonnet compartment 37, above the annular flange 45 and below the shoulder 40. The seal has an upper peripheral edge 76 shaped to conform to the circumferential edge of the vent 14 so as to form a fluid-tight seal when in contact therewith, as shown at 79 in FIG. 2.

The line-sealing member 66 includes an annular seal plate 85, an annular elastomeric seal washer 86, and an annular seal base 87 clamping the washer to the plate. The seal base is formed with a flat top and three depending guide arms 88. The washer 86 is positioned concentrically on the flat top with its peripheral edge overlapping and extending radially beyond the base. The tubular rod 68 is closed at its lower end and provides a solid shank portion 89. The line-sealing member is securely attached to the shank portion in any suitable manner, as by screwthreads 90. The lower portion of the stem 67 is slidably received within the tubular rod 68 for free, vertically reciprocating movement therein. When the stem is completely retracted within the rod, the atmospheric and line sealing members, 65 and 66, are spaced a distance less than the distance between the vent and the inlet port. When the line-sealing member is properly mounted within the vacuum breaker, the guide arms 88 of the seal base extend at all times into the inlet port in slidable guiding engagement with the annular face of the seal ridge 30 which defines inlet port 12. The overlapping portion of the seal washer 86 faces downwardly and contacts the upper rim of the seal ridge to form a fluid-tight seal when the line-sealing member is in its lowermost position within the vacuum breaker.

The upper portion of the closure assembly stem 67 includes an extended section 95 projecting above the atmospheric-sealing member 65 and seated at all times in the well 59 of the capscrew 58 for free reciprocating movement therein.

The upper end of the tubular rod 68 provides an annular upwardly facing surface 97 circumscribing the stem 67 and situated in the lower portion 44 of the main bonnet compartment 37 in all positions of the closure assembly throughout its range of vertical reciprocating movement. The flat rigid annular disk 69 has an interior diameter greater than the diameter of the stem and is slidably mounted on the stem and disposed in the same portion of the compartment. The upper face of its circumferentially marginal portion 98 is adapted to engage the bottom rim 46 of the flange 45 to create a fluid-tight seal when the disk is in its uppermost position. In its lowermost position, the disk rests upon the annular upper end of the rod. The disk is formed of a substantially rigid buoyant material, such as any suitable type of commercially available thermoplastic or thermosetting substance. Its outer diameter is substantialy less than the diameter of the bonnet compartment but approximately equal to the diameter of the passage leading from the body member 27.

A coiled compression spring 105 is vertically mounted within the body member 27 in alignment with the inlet port 12 and the aperture 31 and with opposite end portions seated respectively on the annular face 34 of the body member and the top surface of the seal plate 85 of the line-sealing member 66.

Operation

The operation of the described embodiment of the subject invention is believed to be readily apparent and is briefly summarized at this point. During normal operation of the vacuum breaker, the supply line 20 in which it is mounted is filled with water under substantial pressure. As the water flows through the housing 11 of the vacuum breaker, the line pressure maintains the closure assembly 10 in an elevated position as shown in FIG. 2. In such an elevated position, the atmospheric-sealing member 65 is seated in fluid-tight engagement with the upper wall 39 which circumscribes the vent 14, thus closing the vent. In this elevated position, the line-sealing member 66 is disengaged from the inlet port 12, while the guide arms 88 maintain the closure assembly 10 aligned with that port. Because of the functional design of the working parts of the vacuum breaker, flow can continue through line 20 for an extended period without causing wear on the cooperating surfaces of engaging elements. Under such steady state flow conditions the annular disk member 69 does not serve as a sealing member since an adequate water seal is provided by the atmospheric-sealing member 65.

In order to maintain such normal flow conditions, the pressure in line 20 at inlet port 12 must be of a sufficient value to counteract the total downward force acting on the closure assembly 10 resulting from the atmospheric pressure, the weight of the closure assembly, and the force of the compression spring 105. When the line pressure drops below such a value so as to create a possibility of a backflow, the compression spring forces the line-sealing member 66 downwardly into sealing engagement across the inlet port, independently of the atmospheric-sealing member 65. The relative positions of components in such a case is then as is shown in FIG. 3, which prevents any backflow through inlet port 12. At the same time, if the pressure of the water downstream of the line-sealing member 66 remains appreciably above atmospheric, the atmospheric-sealing member continues to seal off the vent 14 so as to prevent any leakage.

When the pressure in the line 20, and consequently in bonnet chamber 37, drops to or below atmospheric pressure, the atmospheric-sealing member 65 will be forced open, as shown in FIG. 4, thus counteracting the pressure drop and maintaining the minimum pressure in the line at atmophere. Due to the independent operation of the line-sealing member 66 and the atmospheric-sealing member 65, this atmospheric venting will usually occur after the inlet port 12 has already been sealed off.

The nature of the sleeved sliding union of the two members and their range of spacing relative to the spacing of the inlet port 12 and the vent 14 does not allow both the vent 14 and the inlet port 12 to remain open at the same time, except during brief transitional intervals. Such intervals occur, for example, when the line pressure at inlet 12 has previously dropped below atmosphere and subsequently rises. Consequently, both members, 65 and 66, move upwardly simultaneously to resume the normal flow position. During such intervals, when both the inlet port and the vent are temporarily open as shown in FIG. 5, the water commences to flow through the vacuum breaker and, if the line pressure does not immediately force the atmospheric-sealing member into sealing position, there is a possibility of leakage out the vent.

During these transitional intervals, the buoyant disk 69 functions as a seal between upper portion 43 and lower portion 44 of bonnet compartment 37. So long as there is water in the bonnet compartment 37, the buoyancy of the disk causes it to seek an elevated position against the flange 45. Also, the interior surfaces of the body member 27 and the bonnet 28 are such that any water flowing upwardly during these transitional intervals is guided directly onto the lower face of the disk, thus tending to propel the disk upwardly against the flange. Once in engagement with the seat 46 of the flange, the disk 69 is held firmly in place by the force differential acting against its completely exposed underside. While so seated, the disk blocks the upward flow of water and prevents leakage through vent 14. Some seepage occurs through the annular space separating the disk from the stem 67; however, this is insufficient to cause leakage through the vent during the brief interval in which the vent and the inlet port 12 remain open.

The compression force of the spring 105 and the relative spacing of the atmospheric-sealing member 65 and the line-sealing member 66 all combine to determine the line pressures which will activate the device.

For field testing purposes, cocks may be provided in the housing to allow ascertainment of flow conditions through the vacuum breaker.

From the foregoing it will be evident that an improved vacuum breaker has been provided having a simple, economical and durable structure which is capable of effective leakproof operation in a fluid supply line under pressure. Further, the vacuum breaker includes a single closure assembly for venting to atmosphere, blocking backflow and preventing leakage.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A vacuum breaker comprising a housing having a fluid inlet port, an outlet port, a vent to the atmosphere disposed at an elevation above the inlet port and the outlet port, a passage providing fluid communication between the ports and the vent, and an annular seat intermediate the vent and the ports, and circumscribing said passage; reciprocating means mounted in the housing for alternately successively closing the inlet port and the vent; and a buoyant member mounted in the housing elevationally below the seat and above the ports for elevational movement relative to the reciprocating means between a position engaged with the seat and closing the passage and a position downwardly retracted from the seat.

2. A vacuum breaker comprising a housing having a fluid inlet port, an outlet port, a vent to the atmosphere disposed at an elevation above the inlet port and the outlet port, a passage providing fluid communication between the ports and the vent, and an annular seat intermediate the vent and the ports, and circumscribing said passage; reciprocating means mounted in the housing for closing the inner port and the vent; and a buoyant member mounted in the housing elevationally below the seat and above the ports for elevational movement relative to the reciprocating means between a position engaged with the seat and closing the passage and a position downwardly retracted from the seat.

3. A vacuum breaker comprising a housing having a fluid inlet port, an outlet port, a vent to the atmosphere disposed above the inlet port and the outlet port, an annular substantially horizontal interior seat intermediate the vent and the ports, and providing a passage between the ports and the vent and being circumscribed by the seat; reciprocating means mounted in the housing for individually closing the inlet port and the vent; and a buoyant member mounted on the reciprocating means below the seat and above the ports for elevational movement independently of the reciprocating means between a position engaged with the seat and closing the passage and a position downwardly retracted from the seat.

4. A vacuum breaker comprising a housing having a fluid inlet port, an outlet port, a vent to the atmosphere disposed above the inlet port and the outlet port, an annular substantially horizontal interior seat intermediate the vent and the ports, and providing a passage between the ports and the vent circumscribed by the seat; reciprocating means mounted in the housing for closing the vent; reciprocating means for closing the inlet port, said means for closing the vent and said means for closing the inlet port being slidingly engaged in mutually supporting relation for collinearly aligned individual reciprocation; and a buoyant member mounted on the reciprocating means below the seat and above the ports for elevational movement independently of the reciprocating means between a position engaged with the seat and closing the passage and a position downwardly retracted from the seat.

5. In a vacuum breaker the combination of a housing having a side wall, a lower wall and an upper wall, said side wall providing an outlet port, said lower wall providing a downwardly facing inlet port, and said upper wall having a vent in communication with the atmosphere and having an annular shoulder disposed interiorly of the housing in circumscribing relation to the vent, said vent being substantially vertically aligned with the inlet port; an annular substantially horizontal downwardly facing seat interiorly circumscribing the housing and disposed in spaced, vertically aligned relation below the vent and above the outlet port; an elongated closure assembly slidably mounted within said housing for reciprocal, substantially vertical movement, said assembly having upper and lower portions collinearly, slidably connected for independent vertical reciprocation and providing an upper end carrying an atmospheric-sealing member and a lower end carrying a line-sealing member in spaced relation to said atmospheric-sealing member, said assembly cooperating with the housing walls respectively providing the vent to atmosphere and the inlet port respectively to close the same during said reciprocal movement; a buoyant member mounted for vertically sliding movement on said closure assembly intermediate the seat and the outlet port and adapted to seat upwardly on the annular seat in fluid-blocking engagement therewith; and a spring mounted within the housing in engagement with the line-sealing member to urge the same toward said inlet port.

6. In a vacuum breaker the combination of a housing having a side wall, a lower wall and an upper wall, said side wall providing an outlet port, said lower wall providing a downwardly facing inlet port, and said upper wall having a vent in communication with the atmosphere and having an annular shoulder disposed interiorly of the housing in circumscribing relation to the vent, said vent being substantially vertically aligned with the inlet port; an annular substantially horizontal flange interiorly circumscribing the housing and disposed in spaced, vertically aligned relation below the vent and above the outlet port; an elongated closure assembly slidably mounted within the housing for reciprocal, substantially vertical movement, the assembly having upper and lower ends and providing an atmospheric-sealing member at its upper end and an inlet port sealing member at its lower end, the inlet port sealing member having an elongated tubular rod projecting rigidly upwardly therefrom, the atmospheric-sealing member having an elongated stem depending therefrom and slidably housed within the rod for independent reciprocation by said members, said assembly cooperating with the housing walls respectively providing the vent to atmosphere and the inlet port respectively to close the same during said reciprocal movement; a buoyant member mounted for vertically sliding movement on said stem below said annular flange and above the outlet port, said buoyant member being adapted to seat upwardly on the annular flange in fluid-blocking engagement therewith; and a compression spring mounted within the housing in engagement with and urging the inlet port sealing member toward said inlet port.

7. A vacuum breaker comprising a body member having a lower interior surface having an annular seal ridge affording an annular face circumscribing an inlet port provided therein, a side wall having an outlet port, and an annular upper face circumscribing an aperture vertically aligned with the inlet port; an elongated cylindrical tubular bonnet disposed substantially vertically in said aperture in fluid-tight engagement with the body member, the bonnet having an upper wall providing a vent to atmosphere therein and providing an interior annular shoulder circumscribing the vent, said bonnet having an interior annular substantially horizontal flange disposed in spaced vertical alignment below said shoulder; a cap mounted on the bonnet in spaced shrouding relation to the vent and having a central portion provided with an elongated vertical downwardly opening well disposed vertically above said vent; an atmospheric-sealing member including a rigid platform and an elastomeric seal mounted thereon adapted for sealing engagement with the annular shoulder of said bonnet; an inlet port sealing member including a seal base having guide arms extended axially downwardly therefrom in slidable engagement with the annular face of the seal ridge of said inlet port, a rigid annular seal plate disposed below the annular upper face of the body member in overlapping axially spaced concentric relation above said seal base, and an annular elastomeric seal washer clamped between the plate and the base in concentrically overlapping relation to the base and adapted to engage the annular seal ridge in sealing relation therewith; an elongated stem having a midsection, a lower end portion and an upper end portion, including an extended section of the upper end portion; said atmospheric-sealing member being mounted on the upper end portion with the extended section protruding vertically above the atmospheric-sealing member and being slidably reciprocatingly seated within the well of said cap; an elongated tubular rod having an open upper end and a closed bottom portion, the rod having an interior diameter greater than the diameter of the lower end portion of the stem to receive the same within the rod in sliding engagement, said inlet port sealing member being mounted on the bottom portion of the rod; the respective lengths of the tubular rod and the stem being such that when the lower end portion of the stem rests against the bottom portion of the rod, the inlet port sealing and the atmospheric-sealing members are held in spaced relation at a distance less than the distance between the vent and the inlet port; an annular buoyant seal disk slidably mounted on said elongated stem between the annular flange of the bonnet and the upper end of the rod for reciprocation thereon, said disk having an upper peripheral sealing edge adapted to engage the annular flange of said bonnet in sealing relation therewith, said disk having a diameter substantially less than the interior diameter of the bonnet and substantially greater than the inner diameter of the flange; and a coil spring disposed in compressed engagement between the annular upper face of the body member and the seal plate of the inlet port sealing member to urge the same toward said upper face.

No references cited.

ALAN COHAN, *Primary Examiner.*

D. LAMBERT, *Assistant Examiner.*